Figure 1:
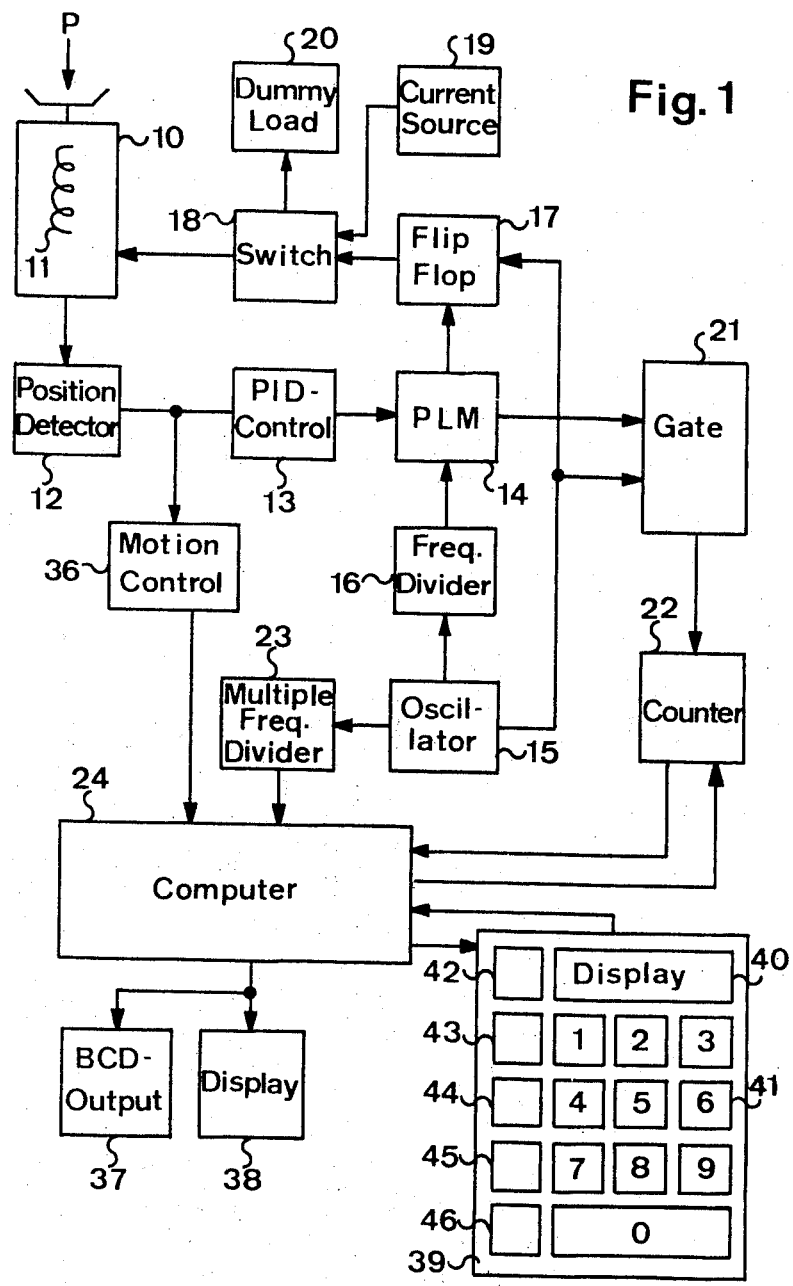

United States Patent [19]
Baumann et al.

[11] 3,872,936
[45] Mar. 25, 1975

[54] WEIGHING APPARATUS INCLUDING PULSE COUNTER MEANS HAVING A RELATIVELY SMALL CAPACITY

[75] Inventors: Arthur Baumann, Schwerzenbach; Werner Langenegger, Zurich, both of Switzerland

[73] Assignee: Metter Instrumente AG, Zurich, Switzerland

[22] Filed: Mar. 15, 1974

[21] Appl. No.: 451,554

Related U.S. Application Data
[62] Division of Ser. No. 380,720, July 19, 1973.

[30] Foreign Application Priority Data
July 28, 1972 Switzerland.................11333/72

[52] U.S. Cl.............. 177/15, 177/210, 177/DIG. 3
[51] Int. Cl. ....................... G01g 19/40, G01g 3/14
[58] Field of Search................ 177/210, 15, DIG. 3

[56] References Cited
UNITED STATES PATENTS
| | | | |
|---|---|---|---|
| 3,684,875 | 8/1972 | Smith et al...................... | 177/210 X |
| 3,709,309 | 1/1973 | Williams, Jr. et al.......... | 117/DIG. 3 |
| 3,786,884 | 1/1974 | Allenspach...................... | 177/210 |
| 3,788,410 | 1/1974 | Allenspach et al............. | 177/210 X |

Primary Examiner—George H. Miller, Jr.
Attorney, Agent, or Firm—Lawrence E. Laubscher

[57] ABSTRACT

Weighing apparatus of the type including means for generating load compensation pulses the lengths of which correspond with the extent to which a load carrier member is displaced from its initial no-load position upon the application thereto of a load to be measured. High frequency counting pulses are counted by counter means during periods in which the compensation current pulses are applied to the load compensation coil of the apparatus, whereby the number of counting pulses is a function of the magnitude of the load being measured. The apparatus is characterized by the use of counter means having a relatively small capacity with respect to the measuring range of the apparatus, in combination with computer means which control the operation of the counter means to provide the appropriate digital measurement result.

2 Claims, 2 Drawing Figures

WEIGHING APPARATUS INCLUDING PULSE COUNTER MEANS HAVING A RELATIVELY SMALL CAPACITY

This is a divisional application of application Ser. No. 380,720 filed July 19, 1973.

This invention relates generally to a force or mass measuring apparatus of the type including means for generating pulses as a function of the load to be measured, and pulse counter means for counting the pulses to afford a digital measurement of the load. The invention is characterized by the use of counter means having a relatively small capacity with respect to the measuring range of the apparatus, in combination with computer means which control the operation of the counter means to provide the appropriate digital measurement result.

Force measuring apparatus of the pulse counting type including counter means for totalizing counting pulses to provide a digital measurement of the applied load are disclosed in the pending U.S. Pat. applications of Heinz Allenspach Ser. No. 244,054 filed Apr. 14, 1972 (now U.S. Pat. No. 3,786,884 of Jan. 22, 1974) and Peter Kunz Ser. No. 287,854 filed Sept. 1, 1972. (now U.S. Pat. No. 3,786,883 of Jan. 22, 1974). In these prior weighing systems, compensation pulses of appropriate pulse lengths are applied to a compensation coil that is secured to the load carrier for returning the load carrier member to its initial no-load position. The lengths of the compensation current pulses are measured by means of counting pulses that are counted by pulse counter means to afford a digital measurement of the applied load.

In these apparatus a considerable number of pulses must generally be counted. A pulse counting assembly comprising a suitably large number of counting elements simply connected in series in the system suffers from the disadvantage that is involves a relatively high power loss with the result that the total current consumption for the counting assembly can be as much as several amperes. Also, the heat production resulting therefrom is is undesirable, particularly in situations in which the measuring part of the apparatus (i.e., the load-carrier means and associated components) and the evaluation part (i.e., the electronic components) are arranged in a common housing, since the results in the measuring part of the apparatus are undesirably influenced by the variations in temperature of the components of the evaluation part.

Accordingly, a primary object of the present invention is to provide an improved weighing apparatus of the compensated load type wherein counting pulses are counted for periods corresponding with the lengths of the compensation current pulses, characterized by the use of counter means having a capacity that is relatively small with respect to the range of measurement, in combination with computer means for operating the counter means to provide an accurate indication of the actual measurement result. According to the invention, the count contained in the counter at given periods of time is transferred to the computer, whereby the counter is reset to zero from another counting operation. Constant value store means consisting of a Read Only Memory control the computer to give the desired measurement value.

According to another object of the invention, means are provided for automatically taking into account a tare load, so that in a gross measuring operation the net value can be supplied as the measurement result.

Another object of the invention is to provide pulse counting means for storing a preselected desired value, for automatically comparing the desired value and the actual value of the load to be measured, and for supplying the difference between the desired and the actual values.

According to a further object, means are provided for automatically taking into account interference oscillations of the load carrier means that would normally deleteriously effect the measurement result.

A further object of the invention is to provide means for selectively presetting the measuring cycles of varying durations, thereby to control the sensitivity of measurement.

Figure 2:
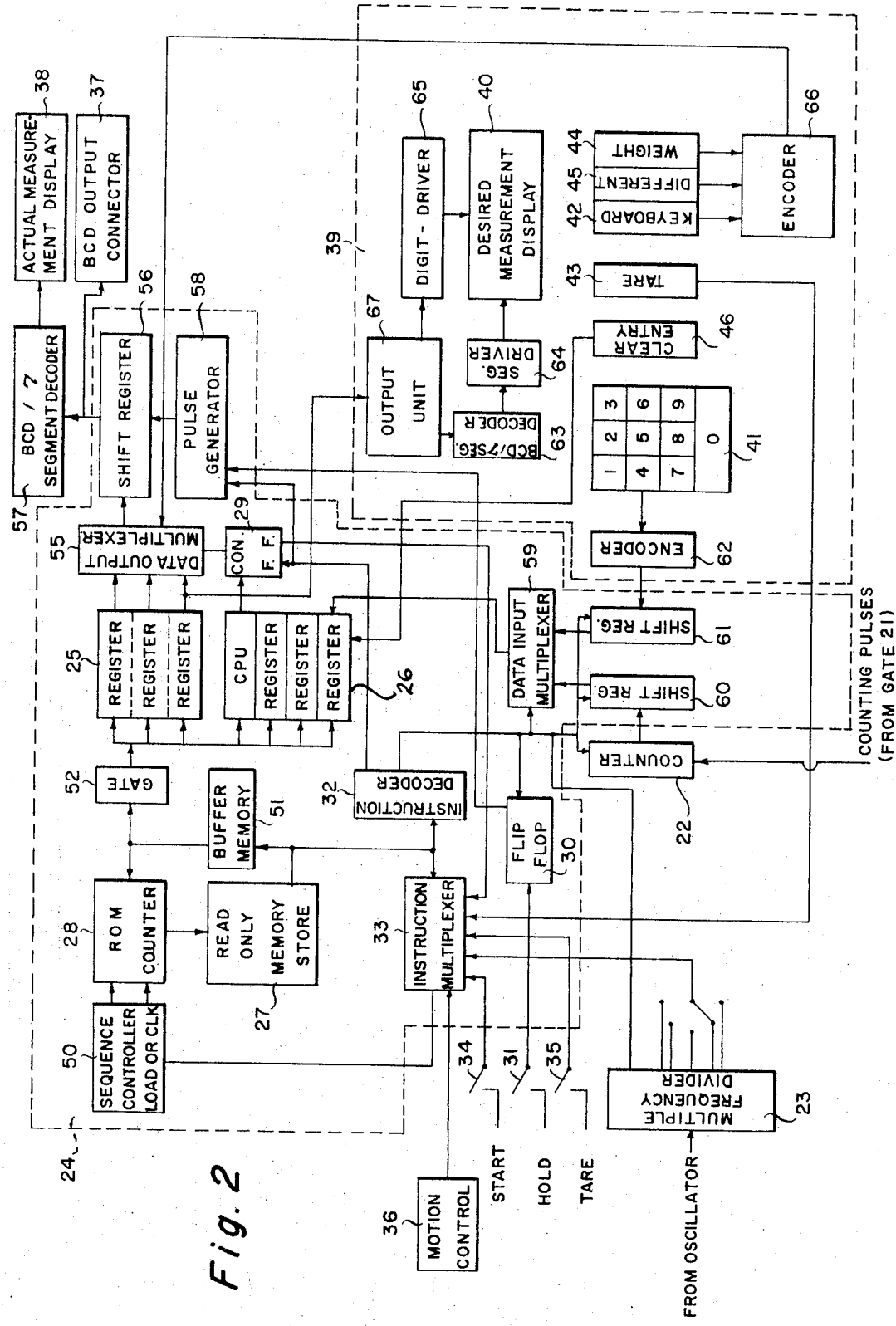

Other objects and advantages of the invention will become apparent from a study of the following specification when viewed in the light of the accompanying drawing, in which:

FIG. 1 is a block diagram of the weighing apparatus of the present invention; and FIG. 2 is a block diagram illustrating more particularly the details of the computer means and the manual input means of the weighing apparatus of FIG. 1.

Referring first to FIG. 1, the basis weighing apparatus is of the electromagnetic load compensation type disclosed in the pending U.S. Pat. application of Peter Kunz Ser. No. 222,960 filed Feb. 2, 1972 and includes, within a pot magnet system, a vertically movable load-carrier means and a capacitive position-sensing means (not shown) which cooperates with the load-carrier means.

As disclosed in the aforementioned Allenspach application Ser. No. 244,054, there are supplied to the compensation coil 11 mounted on the movable carrier element of the weighing apparatus 10 compensation current pulses the lengths of which correspond with the extent to which the applied load P has displaced the load-carrier from its initial zero no-load position. Thus, a position detector and transmitter circuit 12, in conjunction with a PID-controller 13, determines the magnitude of a control voltage which is proportional to the weight of the load and which is continuously compared in a pulse-length modulator 14 with a periodically produced sawtooth voltage. Every 2 ms the pulse-length modulator 14 receives from a 10-MHz-oscillator 15 by way of a frequency divider 16 a pulse which resets the sawtooth voltage to zero and allows it to rise again. At the same moment the pulse-length modulator 14 actuates a flip-flop 17 which by way of a switch 18 connects a constant current direct-current source 19 with the compensation coil 11. A compensation current pulse whose duration depends on the load, with a maximum of 2 ms, now flows to the coil 11. The effective pulse length (time $t$) of the compensation current pulse is limited by virtue of the fact that when a state of coincidence between sawtooth voltage and control voltage is reached, the pulse length modulator 14 switches the flip-flop 17 into its other state by means of a fresh signal, whereby the switch 18 switches the current from the source 19 from the coil 11 to a dummy load 20. This procedure is repeated every 2 ms. The above operation of the pulse length modulator 14 is generally disclosed in the Naydan, et al., U.S. Pat. No. 3,028,550.

At the same time as the sawtooth voltage rises from zero, a signal from the pulse length modulator 14 causes a gate 21 to be opened, whereupon counting pulses from the oscillator 15 are applied continuously to the gate 21. When the gate 21 is opened, the counting pulses pass through the gate 21 during the time $t$ and actuate a counter 22 until the above-mentioned state of coincidence between sawtooth voltage and control voltage is reached, whereupon a fresh signal from the pulse length modulator 14 again closes the gate 21. This procedure is also repeated until a measuring cycle, which comprises a multiplicity of individual counting operations or periods is terminated. The number of periods (i.e., the integration time) can be selected by adjusting a multiple frequency divider 23. In the present embodiment for example, the selectable integration times are 0.1 — 0.2 — 0.4 — 1.0 — 2.0 — 4.0 — 10.0 s.

In contrast to the previously proposed arrangement, however, the counter does not sum all the counting pulses up to the end of each of the integration periods, but after each second period of 2 ms, the condition of the counter 22 is transferred to a computer 24 and the counter 22 is set to zero. With a counting frequency of 10 MHz, a counter capacity of 40,000 pulses is therefore sufficient. This means that a time-controlled mode of operation is used, which can be carried into effect in a particularly simple manner. It would also be possible for example to cause the counter in each case to count up to the end of its capacity (for example 100 or 1,000 counting pulses), before transfer of its condition to the computer is effected.

Referring now to FIG. 2, the "actual measurement" counting pulses from gate 21 are supplied to the input terminal of counter 22. The output terminal of the counter is connected with computing unit 26 via shaft register 60 and data input multiplexer 59. Similarly, the "desired measurement" value supplied by the manually operable keyboard buttons 41 of manual input unit 39 and encoder 62 is supplied to the computing means 26 via shaft register 61 and data input multiplexer 59. Preferably the shift registers are of the TTL type. The operation of the data input multiplexer 59 is controlled by decoder means 32.

The high frequency (10 MHz) pulses from the oscillator 15 are supplied to the input of multiple frequency divider 23 which is selectively operable to establish the desired number of counting periods (i.e., the integration time). The selected low frequency pulse signal is supplied to one input of the instruction multiplexer 33. The instruction multiplexer also includes an input from the motion control means 36 (which comprises means for monitoring the stationary condition of the load carrier as disclosed in the Strobel, et al., U.S. application Ser. No. 373,003 filed June 25, 1973, now U.S. Pat. No. 3,789,937 of Feb. 5, 1974 a start input via supply voltage switch 34, tare inputs via tare switch 35 and tare manual input button 43, respectively, and inputs from the Read Only Memory store means 27 and the conditioning flip-flop means 24.

The output terminal of the instruction multiplexer 33 controls the operation of sequence control means 50 which comprises a system of flip-flop and flip-flops for transmitting pulses for determining the operating sequence of the Read Only Memory counter 28. The normal sequence of the Read Only Memory counter 28 is enabled by clock signals, whereas jump commands are transmitted by load signals, as known in the art. The output of the Read Only Memory counter is connected with the Read Only Memory store means 27 which comprises a constant-value storage means having a capacity of 256 × 8 bits. In the alternative, the Read Only Memory store means may comprise any other suitable fast and economical storage device, such as a perforated tape or core storage means. The output terminal of the Read Only Memory Store is connected with the buffer memory 51, the decoder 32 and the instruction miltiplexer 33. Thus the multiplexer 33 forms an order transmitter for the storage means 27 via sequence controller 50, Read Only Memory counter 28 and Read Only Memory Store 27. The cooperation between the multiplexer 33, the Read Only Memory counter 28 and the storage means 27 permits intermediate computing operations or variations in the program schedule by omitting individual operations.

The output from the Read Only Memory store means 27 is connected with the instruction multiplexer 33, the instruction decoder 32 and the buffer memory 51. One output terminal of instruction decoder 32 is connected with the hold flip-flop 30, the multiple frequency divider 23, the counter 22 (for reset control), the data input multiplexer 59 and the shift registers 60 and 61. The other output terminal of instruction decoder 32 is connected with the conditioning flip-flop 29 and with the pulse generator 58. The output terminals of buffer memory 51 are connected with the Read Only Memory counter and the gate 52, respectively. Buffer memory 51 and gate 52 permit use of the (256$x$) 8-bit Read Only Memory with a computer which needs 16 bits for each operative cycle. Thus, while one set of 8 bits is being read out, the other set of 8 bits is stored in buffer memory 51. Gate 52 selectively passes bits to the storage means 25 and the computer means 26.

The computer 24 includes means 25 to which the particular condition of the counter 22 is transferred. Owing to the high speed which can be achieved for transferring the intermediate counter results with subsequent resetting of the counter to zero (i.e., within a period of several nanoseconds), the use of high counting pulse frequencies is permitted. The storage means 25 includes one net register, one tare register, one difference register, one manual storage register and two operating storage registers for effecting running computations. The computing operations are performed by the computing means 26.

The output of the central processing unit (CPU) of the computing means 26 is fed to the conditioning flip-flop means 29 which includes three flip-flops that store the signals "within/outside the measuring range," "sign of the difference:" The outputs of conditioning flip-flop means 29 are connected with the data-output multiplexer 55 and with the instruction multiplexer 33, respectively.

Data-output multiplexer 55 receives data from two of the flip-flops 29 (namely, sign + or sign −) and from the registers of storage means 25. According to the state of keyboard selection of the manual input unit 39 (i.e., depending on the operation of the "weight" button 44 or the "difference" button 45) the proper data is selected and transmitted to the shift register 56 which transforms the serial data to parallel data which is then transmitted to the Binary Coded Decimal output connector 37 (for delivering a signal corresponding to the actual measurement result to external processing means), and to the Binary Coded Decimal seven segment decoder 57 for transmission to the seven-segment actual measurement display 38. The pulse generator 58, which also has an input terminal with "hold" flip-flop 30, comprises a counter which is controlled by decoder 32 for emitting pulses to enable shift register 56 to perform the series/parallel transformation. The "hold" flip-flop 30, which is controlled by an external switch 31, is connected with stationary-condition monitoring means which determine when the load-carrier means is substantially in a stationary condition (as disclosed in the aforementioned Strobel et al. U.S. application Ser. No. 373,003 filed June 25, 1973.

The manual input unit 39 includes an input monitoring display means 40, a set of digit buttons 41 corresponding with the digits 0–9, respectively, a key button 42, a tare button 43 (corresponding with the tare switch 35), "weight" and "difference" buttons 44 and 45, respectively, and a "clear" button 46. For improved operating convenience the manual input unit 39 is in the form of a separate operating unit. The desired value data which is supplied to the output unit 67 from the computer storage means 25 is transmitted to the Binary Code Decimal seven segment decoder 63 which decodes the data from output unit 67 and transmits the same via segment driver 64 to the light-emitting diodes of display 40. The display digits of the desired value display 40 are energized via digit driver means 65. As indicated above, the encoder 66 serves to encode the control signals of the keyboard produced by the "key", "weight" and "difference" buttons 42, 44 and 45, respectively, for controlling the data output multiplexer 55.

OPERATION

The operation of the weighing apparatus will now be described with reference to a weighing operation, the purpose of which is to weigh 135.6 g of a substance into a container.

Assume that the integration time selected by adjustment of the frequency divider 23 is a measuring cycle of 200 ms in length.

Directly after closing the start switch 34 the first "weighing" operation begins (that is, the movement of the load-carrier means under the influence of its own weight [dead load] is compensated, and the counter 22 begins to count). As mentioned hereinbefore, every 4 ms—i.e., at the end of two 2 ms periods—the computer 24 receives an intermediate result from the counter 22. Directly after the computer 24 has received the condition of the counter 22, besides digitally adding the intermediate result with the previous result, there begins a succession of monitoring operations which are concluded within the next 4 ms. If the result of these monitoring operations is positive, after the abovementioned period of 4 ms, the cycle begins at zero from the beginning. If the result is negative, a check is made as to whether the end of the preselected integration period (in this case: 200 ms) was reached. If not, further summing is effected. On the other hand, if the end of the preselected integration period was reached, processing of the result begins, and thereupon a new measuring cycle commences.

The above mentioned monitoring operations are as follows:

a. Is the manual input 39 actuated?
b. Is the tare means (switch 35 or button 43) actuated?
c. Is the load-carrier means still in a condition of excessive movement (inadmissably high level of interference oscillations)?

The first time all conditions are fulfilled and a measuring cycle may proceed without interference, the pulse total is multiplied or divided by a factor corresponding to the selected integration period (in this case: 200 ms), in order to achieve a result which is decadically proportional to the weight, and a value corresponding to the dead load of the balance appears at the display means 38. Pressing the tare button 43 now effects several things: first, the display means 38 is immediately set to zero; second, the dead load measurement result is stored in the tare storage means of the storage unit 25; and third, while the tare button 43 is pressed, the above-mentioned monitoring operation (b) turns out positive and a new cycle begins every 4 ms.

After the above-mentioned container into which the substance is to be weighed has been put on the weighing pan of the balance and the oscillations of the load-carrier means as it settles into its rest or equilibrium condition have terminated, a fresh result appears in the display means 38, which result corresponds with the weight of the container and is formed by subtracting the dead load weight previously recorded in the tare storage means from the new total of pulses as corrected by the factor corresponding to the integration period.

The weight of the container can possibly now be noted. Subsequently, the tare button 43 is again actuated, and the same procedure as above occurs, at the end of which the (corrected) pulses value (corresponding with dead load plus container weight) is stored in the tare storage means.

The value of 135.60 to be weighed in is now fed into the apparatus by means of the operation of key button 42 and digit buttons 41 of the manual input unit 39. By way of illustration, assume that the operator actuates the buttons 41 erroneously (for example, in the order 1 — 5 — 3 — 6 — 0). In this period, beginning with pressing of the button 42, the monitoring operation (a) is positive, and the shortened cycle in the computer 24 is repeatedly run through. The value fed in as above appears in the input monitoring display means 40 and a glance shows the input error (153.6 instead of 135.6). By actuating the "clear" button 46, both the value stored in the meantime in the input storage means of the storage unit 25 and also the monitoring display means 40 are cancelled, and the correct value can be fed in. The button 46 is moreover blocked after actuation of one of the buttons 44 or 45, in order to prevent unintentional cancellation of the displayed value, and is only released after the key button 42 is pressed again.

According to the first of two weighing possibilities the "weight" button 44 can be pressed, whereby the particular weight added in the subsequent weighing operation appears in the display means 38, and a visual check during the weighing-in operation can be effected by comparing the desired value (which is indicated without variation in the input monitoring display means 40) with the actual value shown in the display means 38, which actual value gradually approaches the desired value. On the other hand, the "difference" button 45 can be actuated, whereupon the difference between the desired weight and the (net) actual weight is directly indicated in the display means 38.

Assume that in this example, the "difference" button 45 is pressed, whereupon the monitoring operation (b) again supplies a negative result (= manual input concluded).

During the weighing-in operation which then follows, after the end of each measuring cycle of 200 ms duration, the computer 24 carries out the following operations: correcting the pulse total by the factor corresponding to the integration period, subtraction of the value contained in the tare storage means, for the dead load and the tare of the particular gross measurement result and thereupon subtraction of the manual input value from the resulting net value. This therefore results in a value with a negative sign which becomes smaller and smaller, said value being displayed at the display means 38. When the indicated value finally reaches zero, the weighing operation is completed.

It is frequently desired to weigh a plurality of components into the same container. This can be effected by simply repeating the above-described procedure, that is to say, after each operation of weighing in a component into the container has been completed, the tare button and thereupon the following buttons of the manual input unit 39 are actuated: the key button 42, the cancelling button 46, the key button 42, the digit buttons 41 (input of the desired weight) and, as desired, the "weight" button 44 or the "difference" button 45.

If a movable object is to be weighed, after pressing the tare button for removing the dead load, the object is put onto the weighing pan and the hold button 31 is then actuated. This causes setting of the flip-flop 30, with the following effect: after the stationary-condition monitoring means 36 has for the first time permitted a complete measuring cycle to be run through, and a measurement result has appeared at the display means 38, the result remains unchanged for reading-off, for a desired period, until the hold signal is cancelled by again actuating the switch 31; the display is neither cancelled owing to renewed movement of the load-carrier means, nor can a new display be formed, as a permanent condition of unrest is simulated (monitoring operation [c] above is negative). Without the hold, after each measuring cycle, the result display would either be replaced by a fresh display or would be terminated, as soon as the oscillations of the load-carrier means reach an inadmissably high level.

In the above apparatus, for example the counting pulses are added in the counter 22 during 1, 2 or 3 of a total of 50, 100 or more individual counting operations per measuring cycle, the counting pulses then being transferred to the computer. The selected number of individual counting operations per transfer substantially depends on the selected duration of each individual counting operation, and on the speed of operation of the computer 24.

It is frequently advantageous to be able to adapt the length of the measuring cycles to the particular operation to be performed by the apparatus, so that with the same apparatus, it is possible to carry out measuring operations of short duration with a low degree of precision, and also measuring operations of longer duration, with a higher degree of precision. This can be effected by the above-described means for selectively presetting measuring cycles of varying durations. In this construction, the advantages of the computer 24 becomes particularly clear; in the previously proposed arrangements, in the case of varying integration periods (measuring cycle durations) the counter capacity had to be adapted to the longest integration period, and this was an expense which tended to restrict the free choice of integration periods. With the above-described apparatus, however, it is no longer necessary to take account of the capacity of the counter, which remains uniformly low, when establishing the various integration periods.

The computer 24 preferably comprises MOS-type transistors, that is to say, it operates with field effect transistors. This mode of construction is distinguished by a low power loss and very compact components. The (relatively) low working speed is quite sufficient for apparatus of the kind here in question.

It is also possible however to use a computer comprising COSMOS-type transistors, when for example rather higher operating speeds are required for the computer. The power loss is here even smaller.

Besides being used for determining the measurement result, the computer can afford other considerably advantages as regards the rapid and automatic performance of auxiliary or monitoring functions which, as described hereinbefore, can play a large part in operation of the measuring apparatus, whether for improving the degree of measuring precision, increasing the range of use, or increasing operating convenience.

The apparatus described hereinbefore is in the form of an electromagnetically compensating, top-pan balance. It should be emphasized however that the apparatus can equally be in the form of other force or mass measuring apparatus (for example, string force-measuring apparatus or apparatus whose measuring member includes a piezoelectric crystal). The only prerequisite for advantageous use of the apparatus proposed herein is that the particular apparatus should produce a series of counting pulses that is dependent on weight or force. The larger the amounts of pulses to be counted, the more clearly apparent is the advantageous reduction in the number of counting elements required.

It is also not necessary for there to be a measuring cycle comprising a multiplicity of individual counting operations. The above-described arrangement is also suitable for cases in which the total of counting pulses results from determination of a single measurement value for each measurement result. Various other modifications may be made without deviating from the basic inventive concepts set forth above.

What is claimed is:

1. In an electrical weighing apparatus including a load carrier member, and means (14) responsive to the amount of load on said load carrier member for producing in a given period of time a plurality of pulses the number of which is a function of the load applied to said load carrier, the improvement which comprises
   a. pulse counter means (22) connected with said pulse producing means, said counter means having a counting capacity that is low relative to the measuring range of the weighing apparatus;
   b. actual measurement display means (38) for displaying the actual value of the load being measured; and
   c. computer means (24) connected between said counter means and said display means for controlling the operation of said counter means to totalize a plurality of separate subtotals of said pulse counter means and to transmit to said display means the totalized actual load measurement, said computer means including
   1. count storage means (26); and
   2. means (27, 32) operable during said given period of time for periodically transferring the subtotal counts of said counter means to said count storage means and for resetting said counter means to zero.

2. In an electrical weighing apparatus including a load carrier member, and means (14) responsive to the amount of load on said load carrier member for producing in a given period of time a plurality of pulses the number of which is a function of the load applied to said load carrier, the improvement which comprises
   a. pulse counter means (22) connected with said pulse producing means, said counter means having a low capacity relative to the measuring range of the weighing apparatus;
   b. actual measurement display means (38) for displaying the actual value of the load being measured; and
   c. computer means (24) connected between said counter means and said actual measurement display means for controlling the operation of said counter means to afford the actual load measurement, said computer means including
      1. count computing and storage register means (25, 26);
      2. means including a shift register (60) and a data input multiplexer (59) for introducing the instantaneous count of said counter into said storage register means;
      3. Read-Only Memory store means (27) having input and output terminals, said output terminal being connected with said count computing and storage means;
      4. means for introducing control signals to said Read-Only Memory store means, said introducing means including instruction multiplexer means (33), sequence control means (50) and a Read-Only Memory counter (28) connected with said input terminal;
      5. instruction decoder means (32) having an input terminal also connected with the output terminal of said Read-Only Memory, said instruction decoder means having an output terminal connected with said counter means and with said date input multiplexer; and
      6. means (23) for supplying a timing control signal to said instruction multiplexer to cause said Read-Only Memory store to operate said counter and said display means via said instruction decoder means to transmit the counter signal to said count storage means, to reset the counter to zero, and to cause the transmission of the count in said count store means to said actual measurement display means.

* * * * *